US00RE35323E

United States Patent [19]

Ohtake

[11] E Patent Number: Re. 35,323

[45] Reissued Date of Patent: Sep. 3, 1996

[54] LINEAR MOTION GUIDE UNIT HAVING AN ADJUSTABLE RETAINER PLATE

[75] Inventor: Masaichi Ohtake, Tokyo, Japan

[73] Assignee: Nippon Thompson Co., Ltd., Japan

[21] Appl. No.: 439,006

[22] Filed: May 11, 1995

Related U.S. Patent Documents

Reissue of:

[64] Patent No.: 5,209,575
Issued: May 11, 1993
Appl. No.: 928,908
Filed: Aug. 12, 1992

[30] Foreign Application Priority Data

Dec. 8, 1991 [JP] Japan ..... 3-225297

[51] Int. Cl.[6] ..... F16C 29/06

[52] U.S. Cl. ..... 384/15; 384/45

[58] Field of Search ..... 384/15, 43–45; 464/168

[56] References Cited

U.S. PATENT DOCUMENTS 4,582,369 4/1986 Hoh ..... 384/45 X
4,921,358 5/1990 Kasuga et al. ..... 384/15
5,080,498 1/1992 Tsukada ..... 384/15
5,087,130 2/1992 Tsukada ..... 384/15

*Primary Examiner*—Thomas R. Hannon
*Attorney, Agent, or Firm*—Skjerven, Morrill, MacPherson, Franklin & Friel; Thomas S. MacDonald

[57] ABSTRACT

A linear motion rolling contact guide unit includes a rail, a slider comprised of a center block and a pair of front and rear end blocks, a plurality of rolling members interposed between the rail and the slider and a retainer plate mounted on the slider for providing an intended sealing effect. The end block is formed with an elongated slot and the retainer plate is provided with a projection engageable with the elongated slot such that the projection may move within the slot in the longitudinal direction over a predetermined distance. Thus, even if the retainer plate is comprised of a plastic material and thus expands or contracts relative to the slider for various reasons, such a change in size mya be absorbed effectively so that the retainer plate is self-adjusted in position.

8 Claims, 4 Drawing Sheets

LINEAR MOTION GUIDE UNIT HAVING AN ADJUSTABLE RETAINER PLATE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a linear motion rolling contact guide unit, and, in particular, to a such a linear motion rolling contact guide unit having an improved retainer plate for retaining rolling members.

2. Description of the Prior Art

A linear motion rolling contact guide unit is well known in the art, and it generally includes a rail 1, a slider 20 slidably mounted on the rail 1 and a plurality of rolling members 4 interposed between the rail 1 and the slider 20 to thereby provide a robing contact between the rail 1 and the slider 20 as shown in FIG. 6 . The guide unit shown in FIG. 6 is a so-called infinite stroke type and thus a pair of endless circulating path, each including a load path section; a return path section and a pair of curved connecting path sections each connecting the corresponding ends of the load and return path sections, is provided in the slider 20, thereby allowing to provide an infinite relative linear motion between the rail 1 and the slider 20 theoretically.

As shown in FIG. 6 , the rail 1 is generally rectangular or square in cross section and thus it includes a pair of opposite side surfaces 11, each of which is formed with an inner guide groove 9 extending in parallel with the longitudinal axis of the rail 1. The slider 20 has a generally U-shaped cross section and thus it generally includes a horizontal section and a pair of vertical sections each depending from a corresponding side of the horizontal section. Thus, the slider 20 is slidably mounted on the rail 1 in a straddling manner. In the example shown in FIG. 6 , the slider 20 has a three part structure: a center block 2 and a pair of front and rear end blocks 5, each located at each end of the center block 2. The center block 2 is often referred to as a casing and the end block 5 as a side cap in this field of technology.

The main reason why the slider 20 is comprised of such three parts is because each section of the endless circulating path is formed in a corresponding part. That is, the center block 2 is formed with an outer guide groove 8 which is located opposite to and in parallel with the associated inner guide groove 9 of the rail 1 to thereby define a load path section between the paired inner and outer guide grooves 9 and 8. The center block 2 is also formed with a return path section 36 which extends in parallel with the load path section 8–9. On the other hand, each of the end blocks 5 is formed with a curved connecting path section connecting the corresponding ends of the load and return path sections to thereby define an endless circulating path.

A plurality of rolling members 4, e.g., balls or rollers, are provided in each of the endless circulating paths, some of those balls 4 that are located in the load path section are shown in FIG. 6 . Thus, the balls 4 that are located in the load path section provide a rolling contact between the rail I and the slider 20. Since the balls 4 may roll indefinitely along the associated endless circulating path, a theoretically indefinite relative motion may be provided between the rail 1 and the slider 20 as long as the rail 1 extends.

The end block 5 is typically provided with an end seal member 19 for providing a sliding seal between the rail 1 and the slider 20 and also with a grease nipple 18 for supplying a lubricant to a sliding interface between the rail 1 and the slider 20 through a lubricant passage formed in the slider 20. In addition, the slider 20, in particular its center block 2 is provided with a holder band 17 which extends in parallel with and spaced apart from the outer guide groove 9 so as to hold the balls 4 in a spaced defined by the outer guide groove 9 and thus to prevent the balls 4 from falling off when the slider 20 is disassembled from the rail 1. Thus, the holder band 17 is located inside and near the valley of the inner guide groove 9 when the slider 20 is assembled with the rail 1 as best shown in FIG. 7.

Moreover, the center block 2 is also provided with a retainer plate 3 for further assuring to prevent the balls 4 from falling off the center block 2 and also for providing a seal between the center block 2 and the side surface 11 of the rail 1 and also at a bottom surface of the center block 2. FIGS. 7 and 8 illustrate a typical prior art retainer plate 3 which is described in the Japanese Pat. Laid-open Pub. No. 64-112021 which was assigned to the assignee of this application. As shown in FIGS. 7 and 8, the retainer plate 3 includes a first seal section 7 which extends somewhat aslant downward in the form of a lip, a second seal section 10 which extends horizontally and defines a seal surface at its top surface 21, and a retaining section 6 which extends vertically upward for holding the roiling members at its top end. And, these first and second seal sections 7 and 10 and the retaining section 6 are integrally formed from the same material, preferably a resin material.

In the illustrated example, the retainer plate 3 is fixedly attached to the center block 2 by bringing its top surface 21 in contact with a bottom surface 12 of the center block and inserting and tightening a screw 16 into a threaded hole in the center block through a through-hole 15 formed in the retainer plate 3. In this case, those balls in the outer guide groove 8 are retained in the center block 2 by the retaining section 22 of the retainer plate 3 arranged in contact with a side surface 22 of the center block 2 and also by the holder band 12 which is fixedly attached to the center block 2 at its opposite ends. In the structure shown in FIG. 7, a distance between a top edge 23 of the outer guide groove 8 and a top end surface 14 of the retaining section 22 of the retainer plate 3 is set to be larger than the diameter of the ball 4 so as to allow the ball 4 to roll along the load path section defined between the outer and inner guide grooves 8 and 9. However, a spacing between the holder band 13 and the top end surface 14 of the retaining section 6 is set to be smaller than the diameter of the ball 4 so as to prevent the ball 4 from slipping away from the outer guide groove 8.

In the structure shown in FIG. 7, each of the outer and inner guide grooves 8 and 9 has a generally V-shaped cross section deftned by a pair of curved, or circular, guide surfaces so as to provide an increased load bearing capability as compared with a pair of flat guide surfaces. Furthermore, as shown in FIG. 7, a top edge of the outer guide groove 8 is located at the side of the rail 1 with respect to a hypothetical vertical line passing through the center of the ball 4 in contact with the outer guide groove 8, and a bottom edge of the outer guide groove 8 is located at the side of the center block 2 with respect to the vertical line. Thus, a larger gap is provided between the side surface 11 of the rail 1 and the lower side surface 22 of the center block 2 as compared with a gap between the side surface 11 and an upper side surface of the center block 2 above the outer guide groove 8. This allows the retaining section 6 of the retainer plate 3 to be located between the opposed side surfaces 11 and 22.

As described before, the retainer plate 3 is preferably comprised of an elastic material, such as a plastic or resin material in a unitary structure, for example, by injection molding. Since the lip-shaped first seal section 7 is in sliding contact with the side surface 11 and the retaining section 6 is in contact with the side surface 22 of the center block 2, the gap between the rail 1 and the center block 2 is effectively sealed. Moreover, since the second seal section 10 is fixedly attached to the bottom surface 12 of the center block 2, the bottom surface 12 of the center block 2 is effectively sealed.

However, in the above-described prior art linear motion rolling contact guide unit, since the retainer plate 3 is fixedly attached to the center block 2 by means of screws 16, when the retainer plate 3 has become swelled because of impregnation of grease or oil, for example, after a long period of time, the retainer plate 3 becomes deformed. As a result, the sealing condition of the retainer plate iS deteriorates. For example, the first seal section 7 may be separated away from the side surface 11 and/or a gap is provided at an interface be tween the second seal section 10 and the bottom center block 2. Then undesired foreign matter and/or dust may sneak into the interior of the guide unit and cause an increase in the sliding resistance. In addition, the retaining section 6 of the retainer plate 3 may also be deformed to increase the spacing between the holder band 13 and the top end surface 14 of the retaining section 6, and, as a result, the balls 4 may fall off when the slider 20 is disassembled from the rail 1.

SUMMARY OF THE INVENTION

In accordance with the present invention, there is provided a linear motion rolling contact guide unit, comprising: a rail extending straight over a desired length, a slider slidably mounted on said rail in a straddling manner, a plurality of rolling members interposed between said rail and said slider; sealing means for sealing a gap between said rail and said slider at a mouth of said gap for preventing undesired matter from entering into the interior of said guide unit; and mounting means for mounting said sealing means on said slider such that said mounting means absorbs a change in size of said sealing means relative to said slider so as to keep an intended sealing effect substantially unchanged even if said sealing means changes in size.

Preferably, the sealing means includes a retainer plate includes a first section to be in sliding contact with a side surface of said rail. Preferably, the retainer plate also includes a second section to be in contact with a side surface of the slider and a third section to be in contact with a predetermined portion of a bottom surface of the slider.

Preferably, the mounting means includes at least one first engaging means provided in said retainer plate and at least one second engaging means provided in said slider, said second engaging means being engageable with said first engaging means such that said first and second engaging means may move relative to each other at least in a direction parallel with the longitudinal axis of the guide unit. Either one of the first and second engaging means is a projection having a first predetermined shape and the other is a slot having a second predetermined shape in which said projection may be slidably inserted. The tirst and second predetermined shapes are complementary to each other and they are generally in the shape of a mushroom.

In the preferred embodiment, the slider includes a center block and a pair of end blocks, each of which is located at each end of said center block, and said second engaging means is provided in each of said end blocks.

It is therefore a primary object of the present invention to provide an improved linear motion rolling contact guide unit.

Another object of the present invention is to provide an improved linear motion roiling contact guide unit including a self-adjustable retainer plate.

A further object of the present invention is to provide an improved linear motion rolling contact guide unit having a stable and reliable sealing characteristic for an extended period of time.

A still further object of the present invention is to provide an improved linear motion rolling contact guide unit having an extended service life.

A still further object of the present invention is to provide an improved linear motion contact rolling contact guide unit simple in structure, easy to manufacture, high in accuracy and low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 6:
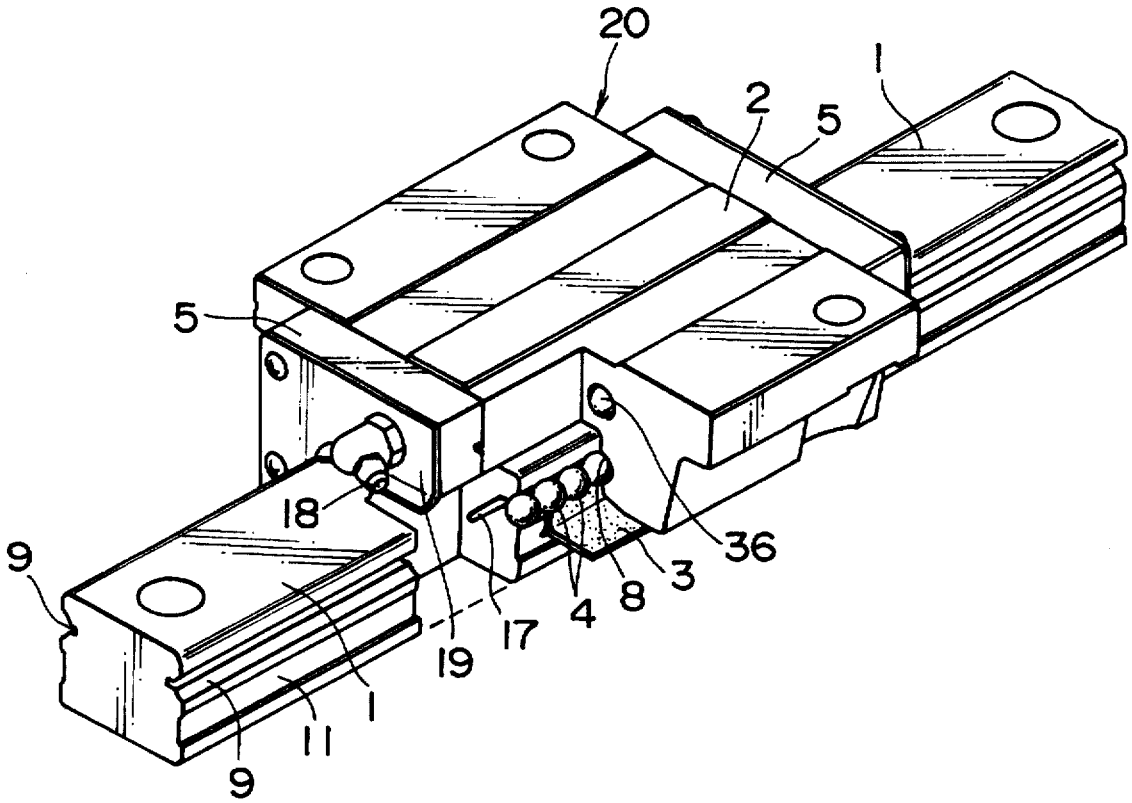
Fig. 6 Prior Art
FIG. 6 is a typical prior art linear motion rolling contact guide unit to which the present invention may be advantageously applied.

It is to be noted that a linear motion rolling contact guide unit of the present invention has a basic structure similar to that of the prior art guide unit shown in FIG. 6. That is, as shown in FIG. 6, the present linear motion rolling contact guide unit also includes a rail 1 which extends straight over a desired length. The rail 1 has a pair of side surfaces 11, each of which is formed with an inner guide groove 9 extending in parallel with the longitudinal axis of the rail 1. The present guide unit also includes a slider 20 which is generally U-shaped in cross section and thus slidably mounted on the rail 1 in a straddling manner. The present guide unit also includes a plurality of rolling members 4, such as balls or rollers, interposed between the rail 1 and the slider 20 so as to provide a rolling contact between the rail 1 and the slider 20.

In the preferred embodiment, the slider 20 has a three-part structure, i.e., a center block 2 and a pair of end blocks 5 each located at each end of the center block 2. And, the slider 20 is provided with a pair of endless circulating paths, each including a load path section, a return path section and a pair of curved connecting path sections, each connecting the corresponding ends of the load and return path sections. Preferably, the load and return path sections are provided in the center block 2 and each of the curved connecting path sections is provided in a corresponding one of the end blocks. In this case, the pair of endless circulating paths are defined when the center and end blocks 2 and 5 are assembled into the slider 20.

The slider 20 includes a horizonal section and a pair of vertical sections each depending from a corresponding side of the horizonal section to thereby define a generally U-shaped cross section. An outer guide groove 8 is formed in the inner side surface of each of the vertical sections and the outer guide groove 8 is located in an opposed relationship with the associated inner guide groove 9 of the rail 1 to thereby define the load path section of the ehdless circulating path. Thus, those rolling members 4 which are located in the load path section provide a rolling contact between the rail 1 and the slider 20. Since the rolling members 4 may roll along the endless circulating path indefinitely, the slider 20 may slide along the rail 1 as long as the rail 1 extends.

Figure 1:
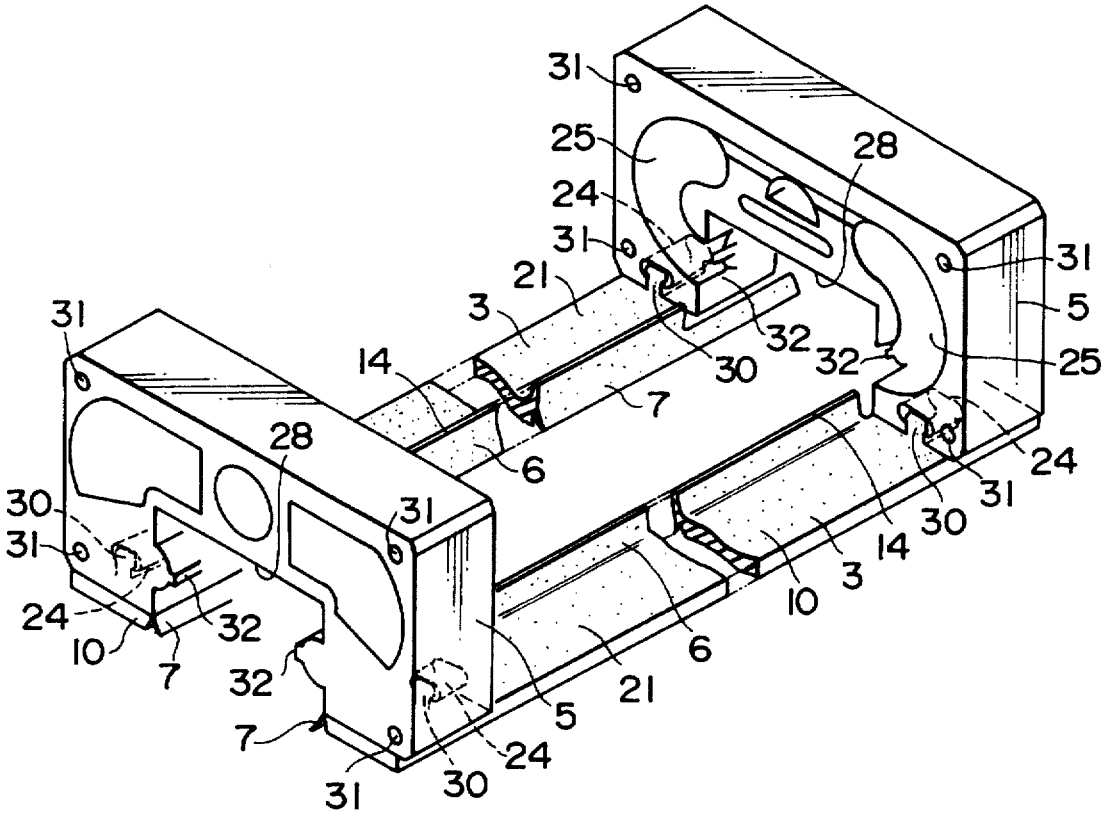
FIG. 1 is a schematic illustration showing in perspective view a slider subassembly including a pair of end blocks and a pair of retainer plates constructed in accordance with one embodiment of the present invention.

The present linear motion rolling contact guide unit includes a specific retainer plate 3 which is mounted on the slider 20 in a specific fashion according to a feature of the present invention. FIG. 1 illustrates in perspective view a slider subassembly, comprised of a pair of end blocks 5 and a pair of retainer plates 3 arranged in parallel and spaced apart from each other, extending between the pair of end blocks 5, constructed in accordance with one embodiment of the present invention. That is, the present linear motion rolling contact guide unit may be constructed by applying the slider subassembly of FIG. 1 to the linear motion guide unit shown in FIG. 6.

Figure 2:
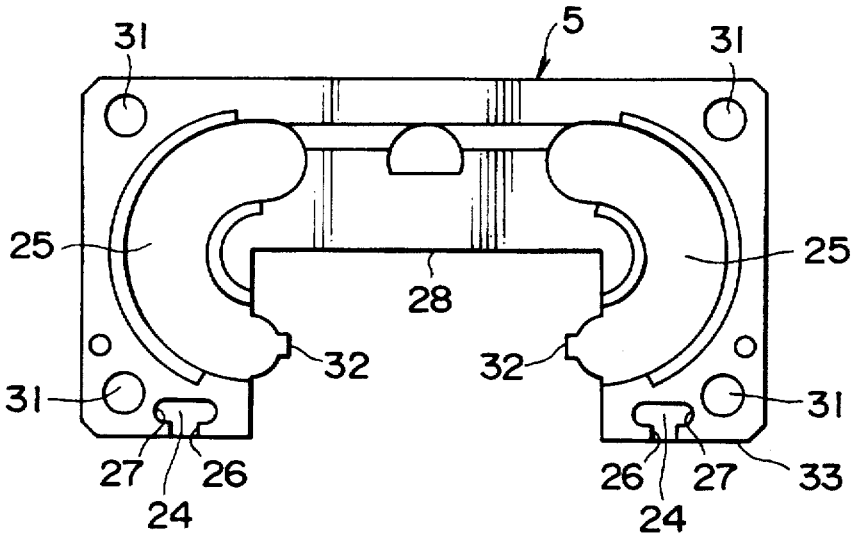
FIG. 2 is a schematic illustration showing in front view an end block of the slider subassembly of FIG. 1.

In the slider subassembly shown in FIG. 1, the two end blocks 5 are located spaced apart from each other over a distance sufficient to locate its associated center block 2 interposed therebetween, and the pair of retainer plates 3 is detachably attached to the end blocks 5. As shown in FIG. 2, the end block 5 has a generally U-shaped cross section and thus a horizonal section and a pair of vertical sections each depending from a corresponding side of the horizontal section. The end block 5 is formed with a plurality of mounting holes 31 through which bolts may be inserted to have the end blocks 5 fixedly attached to the opposite end surfaces of the center block 2. The end block 5 has an inner end surface which is formed with a pair of curved connecting path sections 25, each of which defines a part of an endless circulating path. Since the end block 5 has a generally U-shaped cross section, an inner recess 28 is formed in which the rail 1 may be located when assembled. The end block 5 is provided with a projection 32 projecting inwardly from each of the bottom end of the curved connecting path section 25. The projection 32 is used as a guide for the holder band 13 when assembled.

Figure 3:
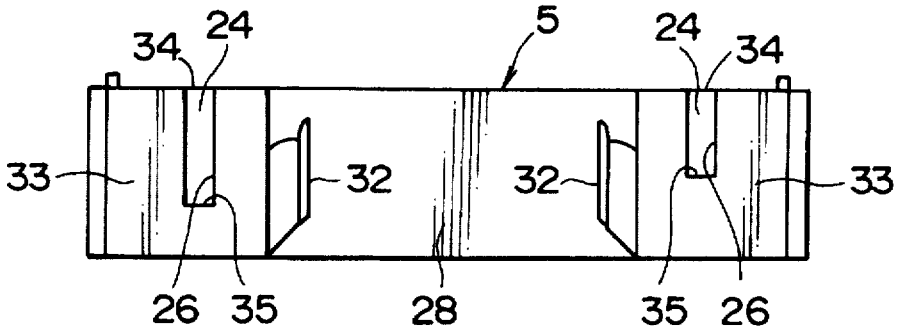
FIG. 3 is a schematic illustration showing in bottom view the end block of FIG. 2.

As best shown in FIG. 2, the end block 5 is formed with a proffiled slot 24 as second engaging means at an end surface 33 of each of its vertical sections. The profiled slot 24 has a cross sectional shape generally in the shape of a mushroom, and, thus, it has an elongated opening 26 and an inner cavity 27 larger in width than the opening 26. As shown in FIG. 3, the slot 24 is elongated in shape in a direction parallel with the longitudinal axis of the guide unit. As shown in FI0.3, the slot 24 has an open end 34 at its inner end surface and a dosed end 35 which serves as a stopper end.

Figure 4:
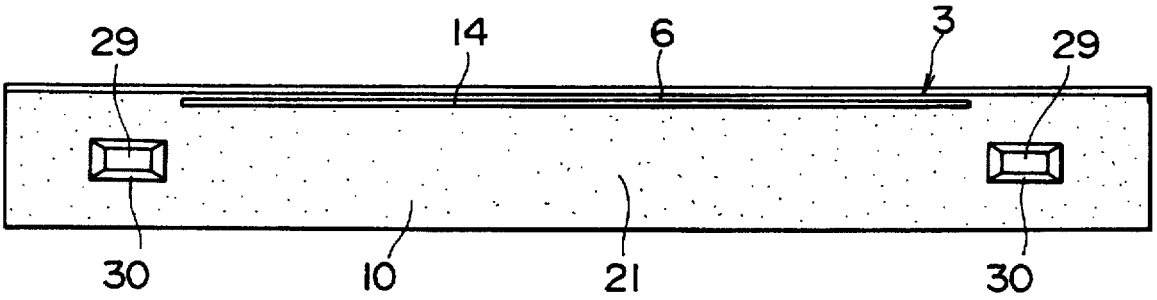
FIG. 4 is a schematic illustration showing in plan view a retainer plate constructed in accordance with one embodiment of the present invention.
Figure 5:
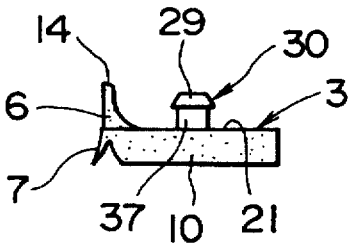
FIG. 5 is a schematic illustration showing in front view the retainer plate of FIG. 4.

On the other hand, as shown in FIGS. 4 and 5, the retainer plate 3 is generally rectangular in shape and has a top surface 21 on which a pair of engaging projections 30 as first engaging means is formed. As best shown in FIG. 5, the engaging projection 30 has a cross sectional shape generally in the shape of a mushroom, including a stem 37 which projects upward from the top surface 21 and a head 29 provided at the top of the stem 37. The engaging projection 30 is complementary in cross section to the slot 24 of the end block 5. As a result, the projection 30 may be slidably inserted into the slot 24 of end block 5 via its open end 34 and may move along the slot 24 until it comes into contact with its closed end 35. Because of the engaging structure between the projection 30 and the slot 24, the retainer plate 3 is prevented from slipping away from the end blocks 5 once brought into engagement, but a relative positional change between the retainer plate 3 and the end block 5 in the longitudinal direction is allowed over a predetermined distance determined by the length of the slot 24.

Figure 7:
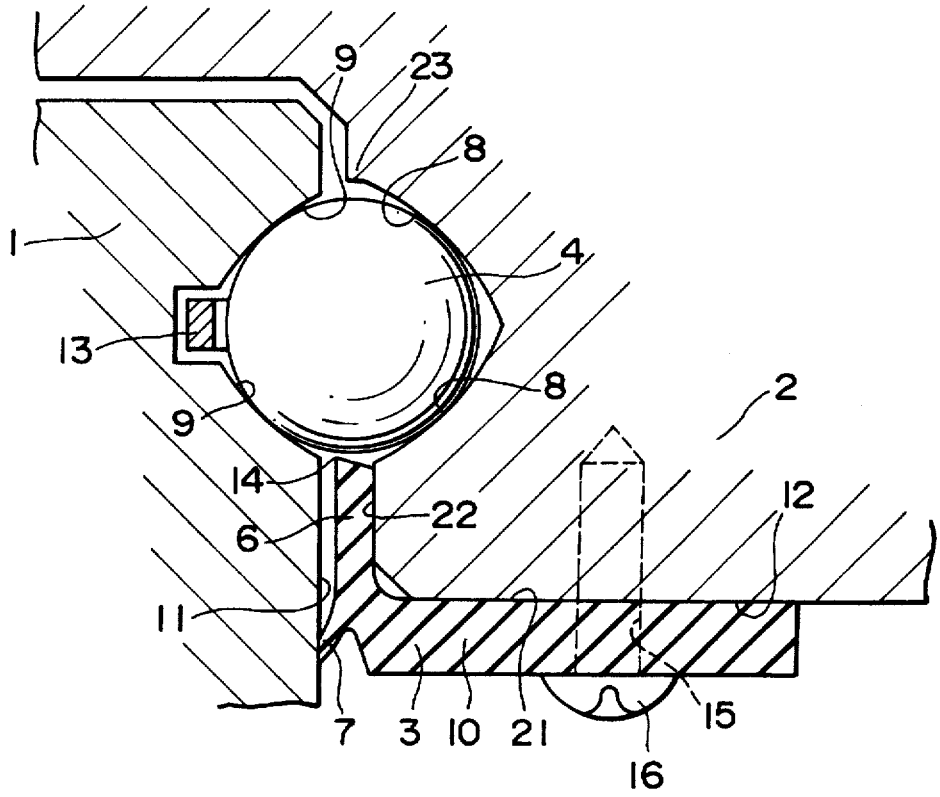
Fig. 7 Prior Art
FIG. 7 is a schematic illustration showing a typical prior art retainer plate when mounted in a linear motion rolling contact guide unit.
Figure 8:
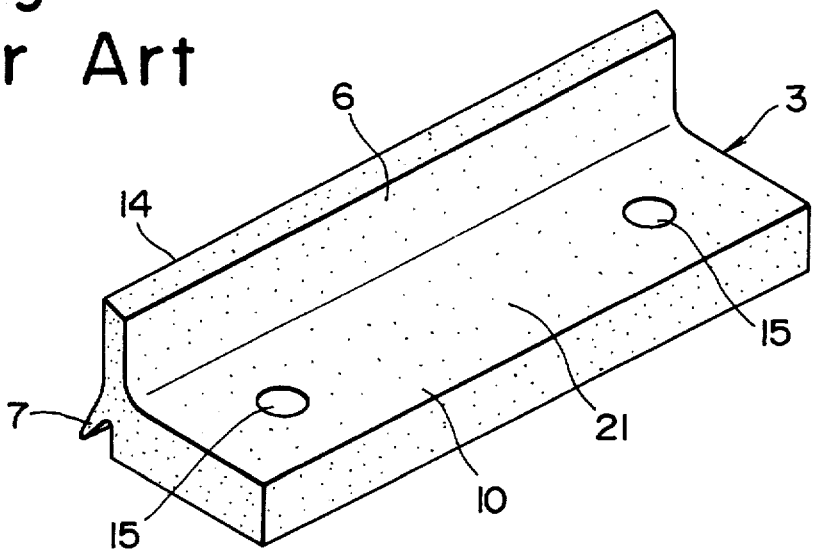
Fig. 8 Prior Art
FIG. 8 is a schematie.illustration showing in perspective view the retainer plate of FIG. 7.

As also shown in FIGS. 4 and 5, the retainer plate 3 includes a retainer section 6 extending upward from the top surface 21 at one side thereof. The retainer section 6 has a top end surface 14 which serves to retain the balls 4 in position. The retainer section 6 is designed to be brought into contact with an inner side surface of the vertical section of the center block 2 when mounted in a manner similar to that shown in FIG. 7. The retainer plate 3 is also formed with a first seal section 7 in the form of a lip extending generally downward and somewhat inclined. The fast seal section 7 is brought into sliding contact with the associated side surface 11 of the rail 1 when assembled. The retainer plate 3 also has a second seal section 10 which defines a major portion of the retainer plate 3 and which is brought into contact with the bottom surface of the center block 2 when assembled. The retainer plate 3 is preferably comprised of an elastic material, such as a plastic material, in a unitary structure. For example, the retainer plate 3 is fabricated by injection molding.

In the embodiment shown in FIG. 4, the retainer plate 3 is provided with a pair of engaging projections 30 one at each end portion. Alternatively, the retainer plate 3 may be formed with only one such engaging projection 30 at one end portion. In this case, that portion of the retainer plate 3 where no such engaging projection 30 is provided may be fixedly attached to the associated end block 5 or to the center block 2, for example, by means of screws or the like.

In accordance with the present invention, since the retainer plate 3 is provided to be movable relative to the center and end blocks 2 and 5 in the longitudinal direction for some reason, such as swelling due to impregnation of oil or grease or differential thermal expansion, the sealing effect provided by the retainer plate 3 can be maintained substantially unchanged at all times. That is, even if the retainer plate 3 has become swelled because of impregnation of grease or the like, it is allowed to expand in the longitudinal direction relative to the center and end blocks 2 and 5 without constraints over a predetermined distance, and, thus, the retainer plate 3 is prevented from buckling.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:

a rail extending straight over a desired length;

a slider slidably mounted on said rail in a straddling manner;

a plurality of rolling members interposed between said rail and said slider;

sealing means for sealing a gap between said rail and said slider at a mouth of said gap for preventing undesired matter from entering into the interior of said guide unit; and mounting means for mounting said sealing means on said slider such that said mounting means absorbs a change in size of said sealing means relative to said slider so as to keep an intended sealing effect substantially unchanged even if said sealing means changes in size.

2. The guide unit of claim 1, wherein said mounting means includes first engaging means provided in said sealing means and second engaging means provided in said slider, said second engaging means being capable of being brought into an engagement with said first engaging means such that a relative positional change is allowed between said first and second engaging means in a longitudinal direction of said unit over a predetermined distance.

3. The guide unit of claim 2, wherein said first engaging means includes a projection having a tirst cross sectional shape and said second engaging means includes a slot having a second cross sectional shape, whereby said projection may be slidably fit into said slot.

4. The guide unit of claim 3, wherein said first and second cross sectional shapes are complementary to each other and generally in the shape of a mushroom.

5. The guide unit of claim 1, wherein said sealing means includes a retainer plate comprised of an elastic material.

6. The guide unit of claim 5, wherein said retainer plate is provided with at least one projection at one end portion thereof.

7. The guide unit of claim 1, wherein said slider has a three part structure, including a center block and a pair of end blocks fixedly attached to front and rear end surfaces of the center block.

8. The guide unit of claim 7, wherein said slider is provided with at least one endless circulating path in which said plurality of rolling members are provided.

* * * * *